US011359854B2

(12) United States Patent
Svejcar et al.

(10) Patent No.: US 11,359,854 B2
(45) Date of Patent: Jun. 14, 2022

(54) AIR DAMPER WITH STEPPER MOTOR

(71) Applicants: Kyle William Svejcar, Westchester, IL (US); Thomas J. Davern, St. Charles, IL (US)

(72) Inventors: Kyle William Svejcar, Westchester, IL (US); Thomas J. Davern, St. Charles, IL (US)

(73) Assignee: Robertshaw Controls Company, Itasca, IL (US)

( * ) Notice: Subject to any disclaimer, the term of this patent is extended or adjusted under 35 U.S.C. 154(b) by 126 days.

(21) Appl. No.: 16/454,347

(22) Filed: Jun. 27, 2019

(65) Prior Publication Data

US 2020/0408455 A1    Dec. 31, 2020

(51) Int. Cl.
    *F25D 17/04*    (2006.01)
    *F16K 31/04*    (2006.01)

(52) U.S. Cl.
    CPC .......... *F25D 17/045* (2013.01); *F16K 31/047* (2013.01); *F25D 2700/02* (2013.01)

(58) Field of Classification Search
    CPC .. F25D 17/045; F25D 17/047; F25D 2700/02; F25D 17/065; F25D 2317/0666; F25D 2317/067; F25D 17/08
    See application file for complete search history.

(56) References Cited

U.S. PATENT DOCUMENTS

| 4,653,283 | A |   | 3/1987  | Sepso       |             |
|-----------|---|---|---------|-------------|-------------|
| 4,682,474 | A | * | 7/1987  | Janke       | F25D 17/045 |
|           |   |   |         |             | 236/46 F    |
| 4,688,393 | A | * | 8/1987  | Linstromberg| F25D 17/045 |
|           |   |   |         |             | 62/180      |
| 4,732,010 | A | * | 3/1988  | Linstromberg| F25D 17/045 |
|           |   |   |         |             | 62/155      |
| 4,735,057 | A | * | 4/1988  | Janke       | F25D 17/045 |
|           |   |   |         |             | 236/49.3    |
| 4,834,169 | A |   | 5/1989  | Tershak et al. |          |
| 4,903,501 | A | * | 2/1990  | Harl        | F25D 17/045 |
|           |   |   |         |             | 137/341     |
| 4,924,680 | A | * | 5/1990  | Janke       | F25D 17/045 |
|           |   |   |         |             | 62/187      |
| 5,375,413 | A | * | 12/1994 | Fredell     | F24F 13/12  |
|           |   |   |         |             | 137/625.33  |
| 5,490,395 | A | * | 2/1996  | Williams    | F25D 17/045 |
|           |   |   |         |             | 62/187      |
| 5,899,083 | A |   | 5/1999  | Peterson et al. |         |

(Continued)

FOREIGN PATENT DOCUMENTS

JP           H11159936 A  *  6/1999    ............. F25D 17/08

OTHER PUBLICATIONS

Translated of JPH 11159936 A (Year: 1999).*

*Primary Examiner* — Emmanuel E Duke
(74) *Attorney, Agent, or Firm* — Reinhart Boerner Van Deuren P.C.

(57) ABSTRACT

An air damper is provided. The air damper includes a base plate having a plurality of plate openings defining an area for the passage of air through the air damper. The slide is slideable over the base plate. The air damper also includes a slide having a plurality of slide openings and a plurality of slide closures. The air damper further includes a stepper motor coupled to the slide to move the slide in linear steps to change the area for the passage of air.

20 Claims, 8 Drawing Sheets

(56) References Cited

U.S. PATENT DOCUMENTS

| | | | |
|---|---|---|---|
| 6,769,263 B1* | 8/2004 | Armour | F16K 31/06 |
| | | | 62/150 |
| 6,880,359 B2 | 4/2005 | Pearson et al. | |
| 6,910,340 B2* | 6/2005 | Nowak | F24F 13/12 |
| | | | 236/49.5 |
| 7,152,419 B1* | 12/2006 | Armour | F16K 31/06 |
| | | | 62/187 |
| 7,174,734 B2 | 2/2007 | Davern et al. | |
| 9,562,620 B2* | 2/2017 | Da Pont | F16K 31/002 |
| 9,970,699 B2* | 5/2018 | Allard | F25D 17/045 |
| 2004/0016247 A1* | 1/2004 | Cho | F25D 17/045 |
| | | | 62/186 |
| 2007/0119198 A1* | 5/2007 | Scrivener | F25D 17/045 |
| | | | 62/187 |
| 2008/0307807 A1* | 12/2008 | Graff | F25D 29/00 |
| | | | 62/186 |
| 2017/0227276 A1 | 8/2017 | Pearson et al. | |
| 2018/0299182 A1* | 10/2018 | Besore | F25D 17/045 |

* cited by examiner

AIR DAMPER WITH STEPPER MOTOR

This invention generally relates to an air control device for a refrigerator and more particularly to an air damper.

BACKGROUND OF THE INVENTION

Refrigerators frequently are sold as combination refrigerator/freezer units that are cooled using a single cooling system. For instance, one common method for cooling a refrigerator/freezer unit is to circulate the air in the freezer compartment over evaporator coils. The cooled air is then used to keep food items in the freezer frozen. In order to keep the food items in the refrigerator chilled, a portion of the cooled air in the freezer compartment is provided to the refrigeration compartment.

In many commonly available refrigerator/freezer units, air that has been cooled at the evaporator coils flows first to the freezer, and then a portion of the air from the freezer flows into the refrigerator compartment. The pathway between the refrigerator and freezer compartments is controlled by a damper. By opening and closing the damper, more or less cold air can flow from the freezer compartment to the refrigerator compartment to maintain the desired temperature in refrigerator compartment.

The air in a refrigerator/freezer unit is relatively humid because the air circulated in refrigerator/freezer unit is taken from the ambient air where the refrigerator/freezer unit is located. The humidity is also attributable in part to the moisture that evaporates from unsealed food in the refrigerator compartment. Additionally, users open the refrigerator door to access the food items contained therein, which causes a large influx of ambient humid air. This moisture in the air frequently causes ice to build up in the damper, which, in turn, can cause a partial or total blockage of airflow through the damper. A partial blockage will prevent the air in the refrigerator compartment from reaching the desired level of coolness. In response, the thermostat will force the coolant compressor to work harder, which can cause it to fail prematurely, leading to an expensive repair or replacement. A total blockage prevents air in the refrigerator compartment from being cooled, which not only causes stress on the compressor and other cooling components but also may cause the food items to spoil.

Conventional door and gate style dampers frequently suffer from such ice buildup. As a consequence, many of these dampers have a built-in heater to melt the ice buildup, which increases the energy usage. Others periodically open and close the gate valve via activation of a solenoid to prevent ice buildup. However, this too results in increased energy use.

U.S. Pat. No. 4,653,283 (hereinafter, "the '283 patent") discloses a moveable damper member controlling the passage of air between the freezer and refrigerator. The moveable damper member is coupled to a temperature responsive unit. The temperature responsive unit has a bellows construction which senses the ambient air temperature in the fresh food compartment of the refrigerator. The damper is open or closed depending on the temperature sensed by the bellows.

The '283 patent improved previously known dampers using bellows with an electrical heater means and a controller located adjacent to the bellows. When the electrical heater means was energized the bellows reacted to open and close the damper. While temperature control was improved it was limited by the functionality of the bellows itself which limited the rate at which the bellows could react to open and close the air damper and to hold a position. Also, the electrical heater resulted in an additional source of energy usage.

Other efforts to address temperature control and ice accumulation were discussed in U.S. Pat. No. 6,769,263 (hereinafter, "the '263 patent"). The '263 patent discussed the problems with gate-style dampers actuated by solenoids. For example, the solenoids have to be frequently activated in order to prevent ice buildup on the air damper. However, the energy required to overcome accumulated ice as well as the frequent activation of the solenoids to cycle the air damper open and closed to prevent ice buildup results in excessive energy usage and in loss of temperature control. That is, the air damper is opened and close to address/prevent ice buildup rather than as a reaction to sensed and desired temperature.

To address the concerns of solenoid actuated gate air dampers, the '263 patent disclosed using the heat generated by the solenoid and conducting it through a thermo-conductive air damper to melt the ice on the air damper. However, such efforts did not eliminate the large amount of energy used by the solenoid to address the ice accumulation. Still further, it did not provide sufficient control of the open air damper area to control the refrigerator temperate.

The '263 patent disclosed embodiments to provide for a partially opened air damper, however, this was disclosed as being accomplished with the use of a control spring and solenoid to open, close and partially open the air damper. Accordingly, depending on the embodiment used, the solenoid had to be energized to keep the solenoid fully open, fully closed or partially open. A continually energized solenoid to hold the air damper open or closed or partially opened uses excessive energy.

Accordingly, there is still a need for timely and accurate temperature control in a refrigerator/freezer utilizing an air damper to control temperature in the refrigerator while at the same time minimizing energy usage and preventing ice from accumulating on the air damper.

BRIEF SUMMARY OF THE INVENTION

In view of the problems discussed above, embodiments of the present invention provide an improved air control device for controlling the amount of air that passes between the freezer compartment and the refrigerator compartment in a refrigerator. The improved air control device is an air damper that moves in discrete linear distances to provide precision control from a fully opened position to a fully closed position utilizing a stepper motor.

Use of the stepper motor allows for the air damper to be opened and closed in incremental linear steps such that an open area for air flow between the freezer compartment and the refrigerator compartment is controlled to control the temperature of the refrigerator compartment. Indeed, by counting precisely the rotations or even partial rotation of the stepper motor shaft, the corresponding linear distance moved by a slide over a base of the air damper to control air flow is determined.

The stepper motor may be de-energized after it has opened or closed or partially closed the air damper to change the area for air flow through the damper. Thus, the stepper motor can be de-energized after the air damper is in its desired position and the air damper will remain in said position until the stepper motor is energized to change the position/state of the air damper. This ability to de-energize the stepper motor at any state of the air damper and have the air damper remain in said state results in energy savings not only from the improvement in control of the area for air flow for temperature control but also energy savings in de-energizing the heat generating motor. Additionally, use of the stepper motor may decrease the amount of ice that accumulates on the air damper because of the improved temperature control the air damper provides.

Indeed, by precisely controlling the air damper to more precisely control temperature there is also an improved control of the moisture in the refrigerator such that cooling does not occur so rapidly that too much ice is produced. As known to those familiar with the art, moisture that is subject to too rapid cooling produces ice. According by controlling the temperature profile of the air baffle utilizing a controller programmed to control the stepper motor to precisely open and close the air damper, then the moisture profile can also be controlled such that the accumulation is ice is avoided as much as possible.

The improved temperature control may reduce the number of times the air damper has to be cycled between fully opened and fully closed to prevent ice buildup. Therefore, use of the stepper motor and the decreased amount of cycling between the open and closed position provides for an air improved air damper utilizing less energy and providing greater temperature control than those heretofore known.

In an embodiment, an air damper is provided. The air damper includes a base plate that is coupled to a slide that is moved by a stepper motor. The slide moves along the bearing surface provided by the base plate to open, partially open/partially close and close a plurality of plate openings in the base plate. When the plurality of plate openings in the base plate are open or partially open they provide an air passage between the freezer compartment and the refrigeration compartment to cool the refrigerator compartment. Conversely, when the plurality of openings of the base plate are closed air cannot pass between the freezer compartment and the refrigerator compartment.

In one embodiment, the plurality of openings of the base plate are generally rectangular in shape and are uniformly spaced apart from one another. They are located along a longitudinal axis of the base plate from a first plate end to a second plate end of the base plate. In an embodiment there may be between 1 and 10 openings. In a preferred embodiment there may be four openings. The total area provided by the sum of the areas provided by each one of the plurality of plate openings is a maximum area through which air passes when the air damper is in the fully open position. Movement of the slide over the base plate can decrease the maximum area to an area less than the maximum area and even to an area of zero to vary the airflow therethrough and thereby control temperature in the refrigerator compartment. So too, movement of the slide over the base plate can increase the area from zero to the maximum area or an amount therebetween as desired by controlled use of the stepper motor.

In one embodiment, the base plate acts as a bearing surface for a slide that is moved along the base plate by the stepper motor on the base plate. The slide moves in directions parallel to the base plate's longitudinal axis. The slide includes a plurality of slide openings uniformly spaced apart from one another and positioned from a first slide end to a second slide end. The plurality of slide openings may be spaced apart from one another to match the spacing between the plurality of openings in the base plate. The plurality of slide openings may be of the same size and number as those of the plurality of openings of the base plate. However, in other embodiments the plurality of slide openings may be size and number different than those of the plurality of openings of the base plate, based, in part, on the desired temperature profile. In a preferred embodiment there may be four slide openings.

The slide also includes a drive arm located proximate the first slide end. The drive arm at one end is connected to the slide's first end. The drive arm's other end, the driven end, is sized and shaped to interface with a gear train which may be mounted to the base plate. For example, the driven end may have a toothed portion that is engaged by the gear train to move the slide.

The gear train interfaces with the driven end of the slide and with the stepper motor to convert the stepper motor's rotational movement into the linear movement of the slide. In an embodiment a gear train couples the stepper motor shaft to a rack on the slide to convert rotational movement of a stepper motor's shaft to linear movement of the slide. This orientation may be utilized where a length and width along the base plate are limited such that the configuration with the stepper motor shaft perpendicular to the longitudinal plane of the slide takes up a minimum length of the base plate. In another embodiment, where the length dimension may not be as restricted, the stepper motor shaft may be coupled to a gear means and to a linear drive screw and ball screw to translate rotational movement of the stepper motor shaft to linear movement of the slide. Yet another embodiment may use slider-crank means to convert the rotational motion of the stepper motor shaft to linear motion of the slide.

In one embodiment, the base plate includes guides that receive the slide therein so as to keep the slide properly aligned and on the base plate as the slide moves in a first direction paralled to a plate longitudinal axis or in a second direction, opposite the first direction. In an embodiment there may be a single guide. In an embodiment there may be four guides with two guides on opposite sides of the base plate. In yet another embodiment, the guides may include stops mounted on the base plate that limit the linear travel of the slide in the first and second directions.

Because in a preferred embodiment the plurality of plate openings of the base plate match the size, spacing and number of the plurality of slide openings, then the slide can be moved by the stepper motor to completely cover the plurality of plate openings, completely open the plurality of plate openings or partially cover the plurality of plate openings such that the maximum open area provided by the plurality of plate openings is decreased to allow less air flow between the freezer compartment and the refrigerator compartment to control the temperature of the refrigerator compartment. Further, edges of the plurality of side openings and edges of the slide ends may be beveled to act as ice scrapers for any accumulated ice on the base plate.

The stepper motor in an embodiment is a 12 volt direct current stepper motor. The general operating principles of a stepper motor are known and will not be explained here other than to note, that with a stepper motor each shaft rotation is divided into equal steps of radial displacement. The number of steps per a complete rotation is predetermined by the stepper motor design. The stepper motor is controlled by a controller for the air damper.

Each rotational step of the stepper motor shaft is converted into linear motion of the slide via the gear train so that the slide moves a linear distance in a linear step that is proportional to the rotational distance/step. Thus, the slide is moved in linear steps that are discrete linear distances in directions parallel to the longitudinal axis of the base plate from the first end of the base plate to the second end of the base plate and from the second end of the base plate to the first end of the base plate.

Thus, unlike air dampers heretofore known in refrigeration, when the stepper motor is energized to move a first rotational step in a first rotational direction, in one embodiment, the slide moves a first linear distance parallel to a longitudinal axis of the base plate to at least partially open the plurality of base plate apertures. The longitudinal axis bisecting and extending from a second end of the base plate to a first end of the base plate. Further rotation of the stepper motor in the first rotational direction moves the slide another linear step which is equal in distance to the distance of the first linear step. Thus, the slide moves in a first direction in linear steps which permits the plurality of plate openings to have a plurality of partially opened positions/partially closed positions as the slide moves in steps over the plurality of openings. So, too the slide can be move in steps until the plurality of plate openings of the base plate are fully opened. Once the slide is in the desired position and the plurality of openings of the base plate are either fully open or at any one of the plurality of partially opened/closed positions there is no need to energize the stepper motor to keep the slide in place thus reducing the amount of energy used by the air damper.

Once the slide has been moved by the stepper motor to provide an air damper in the fully open position or in any one of the plurality of partially opened positions, the stepper motor can be operated to rotate in a second rotational direction, opposite the first rotational direction such that the slide moves in a second linear direction, that is opposite the first linear direction in steps to close or partially close the plurality of openings in the base plate as desired to control temperature.

Temperature in the refrigerator compartment is sensed by a sensor or plurality of sensors in the refrigerator compartment which in turn are connected to a controller which signals the air damper to fully open or to move to one of a plurality partially opened/closed positions or to move to a fully closed position or to cycle open and closed. Each position or cycling open and closed is signaled by the controller so as to timely and accurately control temperature and thus the temperature profile. By temperature profile it is meant the rate of change in temperature. So too controlling the temperature profile also controls the moisture profile in the refrigerator compartment and thereby prevents undesired ice buildup on the air damper.

These and other advantages of embodiments of the invention, as well as additional inventive features, will be apparent from the description of embodiments of the invention provided herein.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
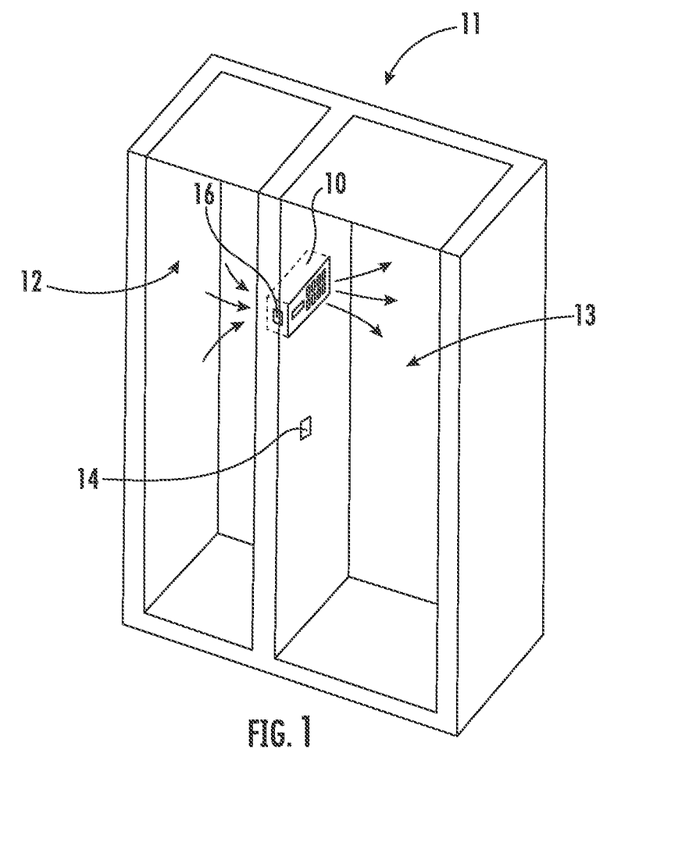
FIG. 1 is a partial perspective view of a typical refrigerator/freezer unit with an embodiment of an air damper according to the invention.

Turning now to the drawings, there is illustrated in FIG. 1 an exemplary embodiment of an air damper 10 in refrigerator/freezer unit 11 located between a freezer compartment 12 and a refrigerator compartment 13. While such an exemplary environment will be utilized in describing various features and embodiments of the invention, such a description should be taken by way of example and not by limitation. Indeed, advantages of the embodiments of the invention can be used to improve a variety of apparatuses where it is desirable to regulate a flow of air.

Temperature in the refrigerator compartment is sensed by a sensor 14 or plurality of sensors in the refrigerator compartment 13 which in turn are connected to a controller 16 which signals the air damper to fully open or to move to one of a plurality partially opened/partially closed positions or to move to a fully closed position or to cycle open and closed. Each position or cycling open and closed is signaled by the controller 16 so as to timely and accurately control temperature in the refrigerator compartment 13 and to prevent undesired ice buildup on the air damper 10. Indeed, the controller 16 is programmed to control the temperature profile and thereby the rate of cooling of moisture in refrigerator compartment 13 so as to prevent undesired ice buildup on the air damper 10. The controller 16 may be on a printed circuit board of the air damper 10 or may be located away from the air damper 10 such that the only connection therebetween is via wired connection or wireless communication means.

Figure 2:
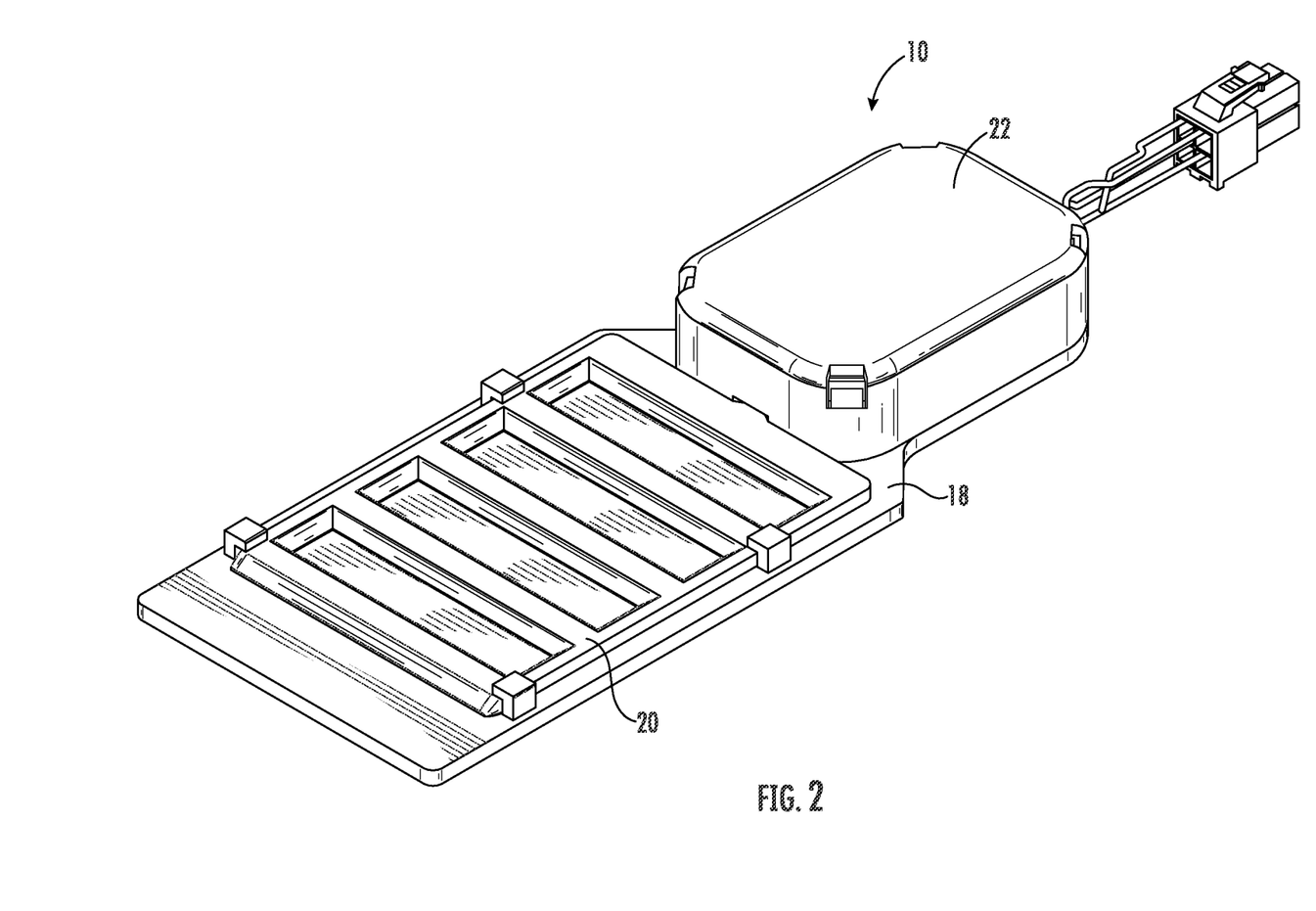
FIG. 2 is a is an isometric view of an air damper according to the teachings of the instant invention, the air damper in the fully closed position.

With reference now to FIG. 2, the air damper 10 has a base plate 18 and a slide 20 configured to move linearly along the base plate 18. A motor cover 22 is mounted on the base plate 18. The air damper 10 is in the fully closed stated such that no air can pass through the base plate 18.

Figure 3:
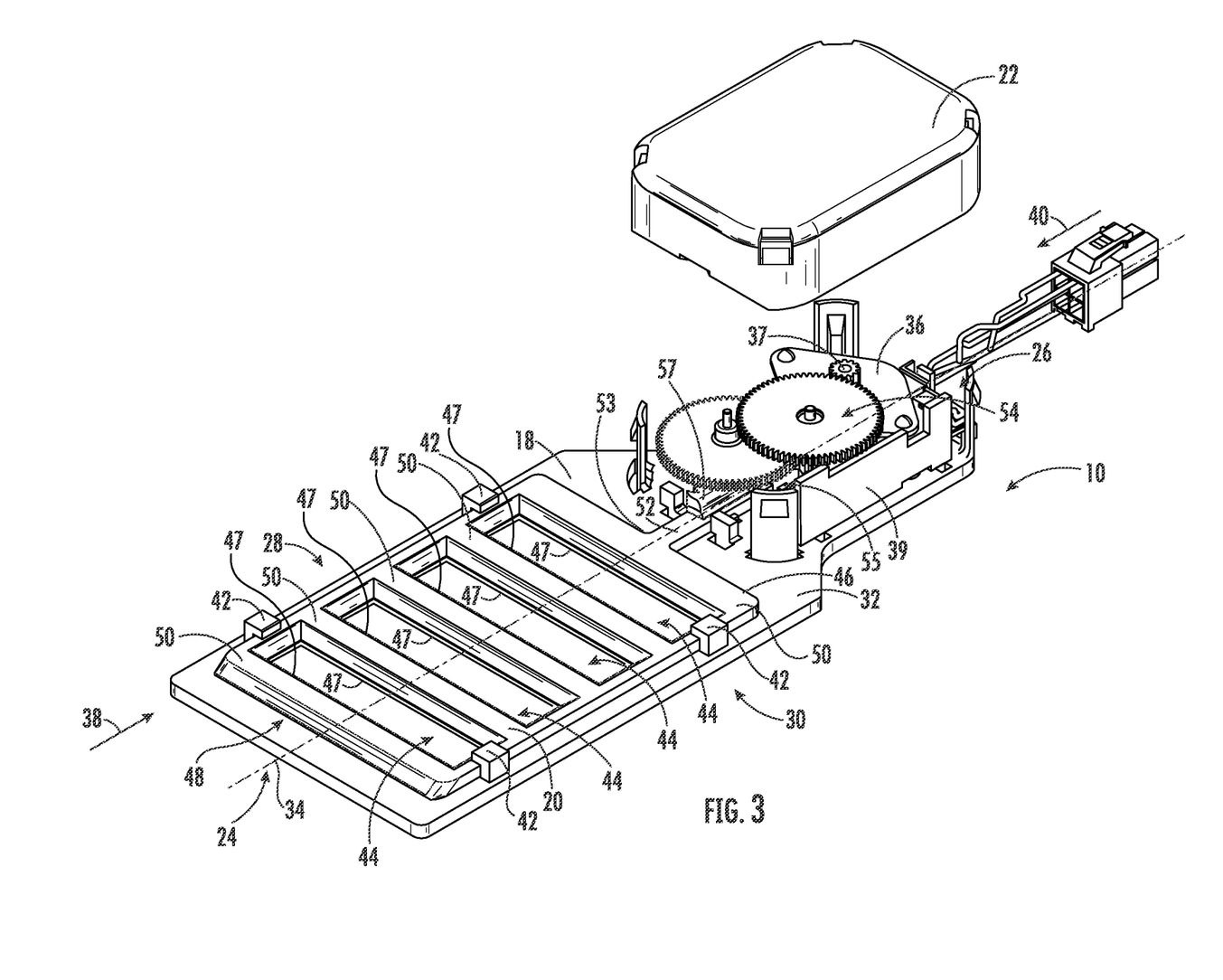
FIG. 3 is a partial exploded isometric view of the air damper of FIG. 2 with a motor housing removed.

FIG. 3 illustrates the air damper 10 with the motor cover 22 removed. The base plate 18 of the air damper 10 has a first plate end 24, a second plate end 26, a first plate side 28, a second plate side 30 and a bearing surface 32. The base plate 18 defines a plate longitudinal axis 34 extending from the first plate end 24 to the second plate end 26.

The slide 20 is moved linearly along the bearing surface 32 of the plate 18 by a stepper motor 36 that rotates its shaft 37. The shaft 37 is configured to rotate in a first rotational direction and a second rotational direction opposite the first rotational direction. The stepper motor 36 is mounted on the base plate 18 and is indirectly coupled to the slide 20 to move the slide 20. The slide 20 moves in a first linear direction 38 parallel to the plate longitudinal axis 34 and from the first plate end 24 to the second plate end 26. The slide 20 is also configured to move in a second linear direction 40, opposite the first direction, parallel to the plate longitudinal axis 34 and from the second plate end 26 towards the first plate end 24.

The base plate 18 includes guides 42 mounted to the base plate 18 that receive the slide 20 therein so as to keep the slide 20 properly aligned and on the base plate 18 as the slide 20 moves in the first and second linear directions 38, 40 along the base plate 18. In an embodiment, there may be between one and ten guides 42. In a preferred embodiment, there may be four guides 42 with a pair of guides 42 proximate the first plate side 28 and a second pair of guides 42 proximate the second plate side 30.

The slide 20 also includes a plurality of slide openings 44 spaced apart from one another and positioned from a first slide end 46 to a second slide end 48. First and second slide ends 46, 48 may be beveled to act as ice scrapers for any accumulated ice on the base plate 18. Edges 47 extending in directions perpendicular to the plate longitudinal axis 34 may also beveled to scrape any accumulated ice on the bearing surface 32 of the plate 18. The slide openings 44 may be generally rectangular but in other embodiments may be of other geometries such as squares or circles or ovals by way of non-limiting examples. The slide 20 also includes a plurality of slide closures 50 between the plurality of slide openings 44.

The slide 20 also includes a drive arm 52. A first arm end 53 of the drive arm 52 is connected to the first slide end 46. A second arm end 55 is a driven end that is opposite the first arm end 53 of the drive arm 52. The driven end 55 may have a toothed rack 57 that is mounted thereon or integral to the driven end to be engaged by the gear train 54 to move the slide 20.

The gear train 54 is comprised of multiple gears in order to translate the rotation of the shaft to linear movement of the slide 20. The gear train 54 meshes with toothed rack 57 of the driven end 55 of the slide 20 and with the shaft 37 of the stepper motor 36 to convert the stepper motor's 36 rotational movement into the linear movement of the slide 20. While a preferred embodiment uses a gear train 54 as the interface between the shaft 37 of the stepper motor 36 and the toothed rack 57 at the driven end 55 of the slide 20, in another embodiment to be discussed with respect to FIG. 8, other means to translate rotational movement to linear movement may be used.

As previously discussed, a printed circuit board (PCB) 39 may be mounted on the base plate 18 together with the stepper motor 36. In an embodiment, the PCB may include a temperature sensor. The temperature sensor may sense an over-temp of the stepper motor 36 and stop the stepper motor 36 to prevent damage to the stepper motor 36.

Figure 4:
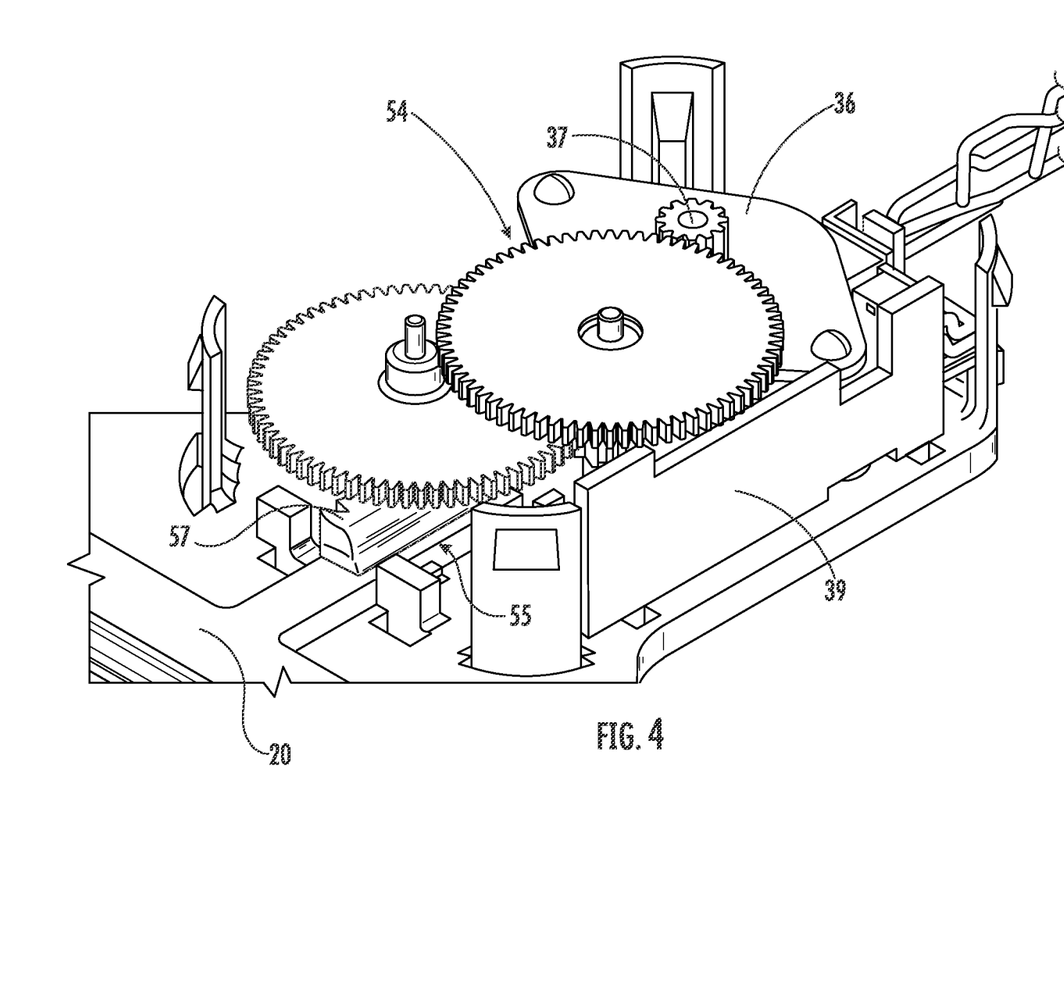
FIG. 4 is an enlarged partial view of the gear train of the air damper of FIG. 3.

FIG. 4 illustrates an enlarged view of the gear train 54 of FIG. 3. The gear train 54 is engaged with the toothed rack 57 of the driven end 55 of the slide 20 to move the slide 20.

The stepper motor 36, in an embodiment, is a 12 volt direct current stepper motor 36. However, while a preferred embodiment may utilize a 12 volt direct current stepper motor, in other embodiments, a stepper motor of different voltage may be utilized to account for customary national electronic usages which may vary from country to country. The general operating principles of a stepper motor are known and will not be explained here other than to note, that with a stepper motor 36 each shaft 37 rotation is divided into equal steps of radial displacement. The number of steps is predetermined by the design of the stepper motor 3 and controlled by the controller 16 (FIG. 1) which, as previously discussed, may be mounted on a PCB 39 or located at another physical location apart from the PCB 39.

Figure 5:
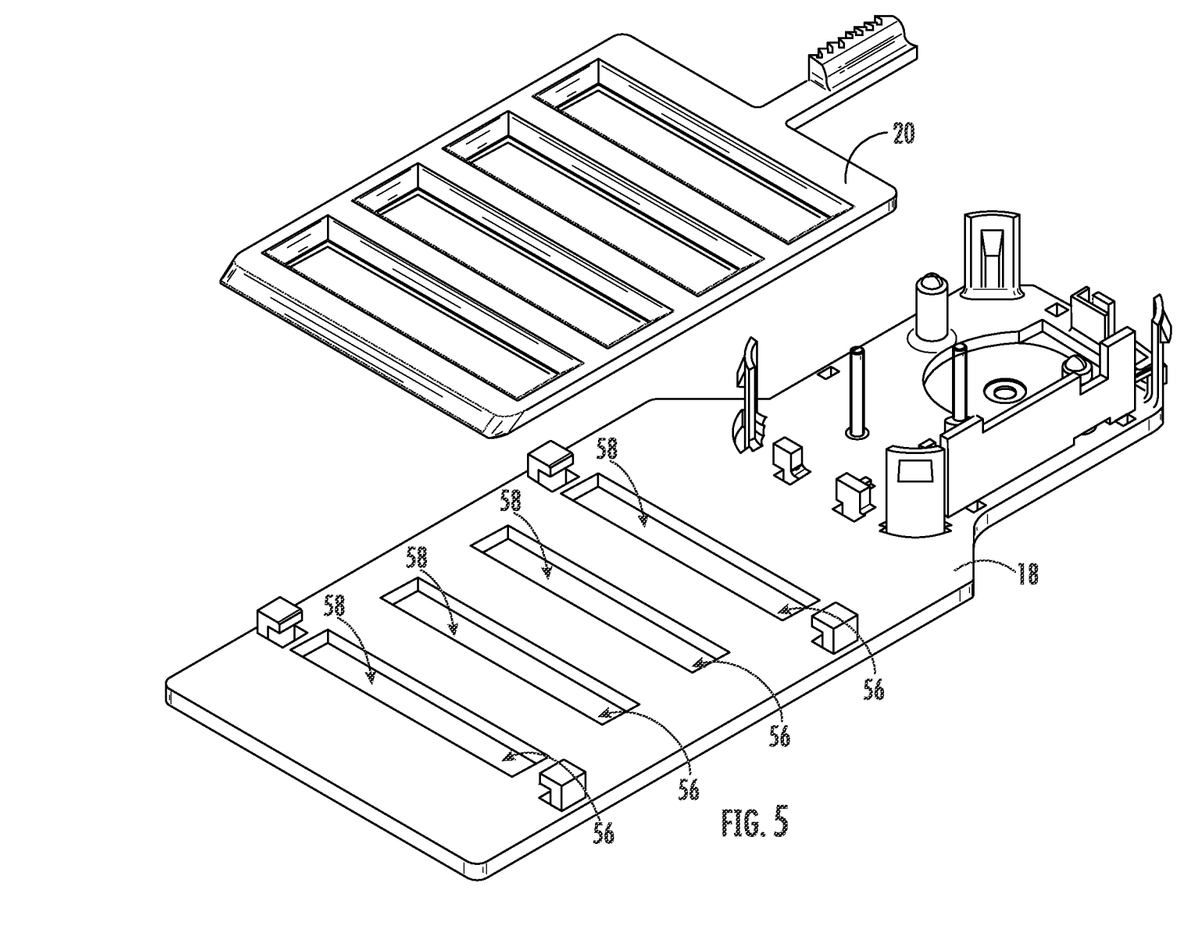
FIG. 5 is a partial exploded isometric top view of a base plate and slide of the air damper of FIG. 3.

FIG. 5 illustrates the slide 20 disassembled from the base plate 18. The base plate 18 includes a plurality of plate openings 56 that are spaced apart from one another along the plate longitudinal axis 34 (FIG. 3). Each plate opening 56 defines a plate area 58 for the passage of air therethrough. Thus, the sum of each plate area 58 of each of the plurality of plate openings provides the maximum total area through which air may pass through the base plate 18 and through the air damper 10 (FIG. 6).

Figure 6:
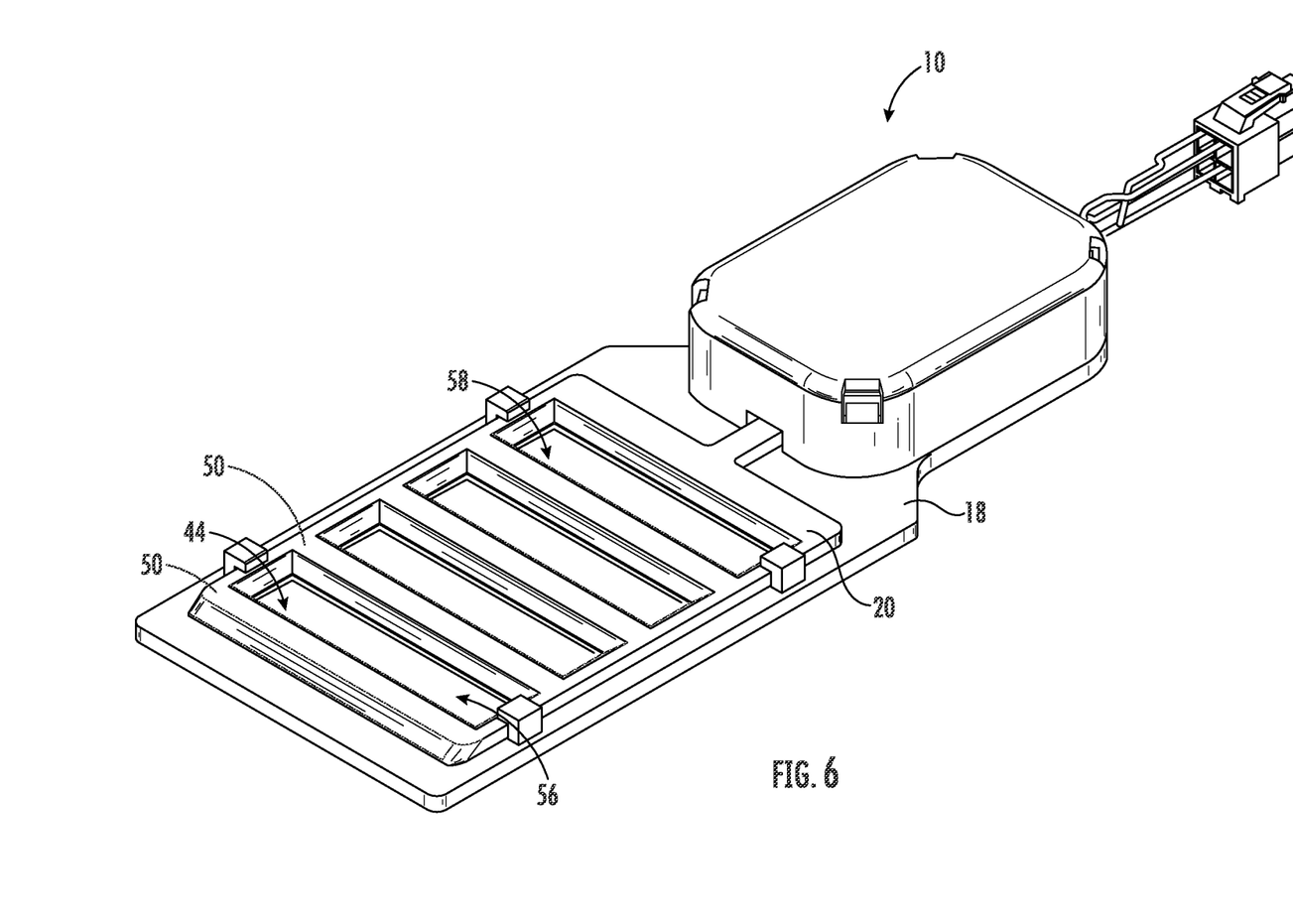
FIG. 6 is an isometric top view of the air damper of FIG. 2 in the fully opened position.

Turning to FIG. 6, the air damper 10 is in the fully open position. The slide openings 44 and slide closures 50 are sized and spaced to cooperate with the plurality of plate openings 56 to allow slide 20 to move to open, close, or partially cover the plate openings 56 of the base plate 18 to change the total area of the air damper 10 through which air may pass. In an embodiment there may be one to ten plate openings 56. In a preferred embodiment, there may be four plate openings 56. Once in the fully open position, the stepper motor 36 can be de-energized for energy savings.

In the fully open position, the plurality of slide openings 44 are aligned with the plurality of plate openings 56 to expose a maximum area that is open for the passage of air. The maximum area is the sum of each open plate area 58 of each one of the plurality of plate openings 56 of the plate 18. The stepper motor 36 (FIG. 3) is energized to move the slide 20 so as to provide for the fully open position of the air damper 10. Once in the fully opened position, the stepper motor 36 may be de-energized and the air damper 10 remains in its fully opened state. Thus, energy is saved with de-energization of the stepper motor 36.

Figure 7:
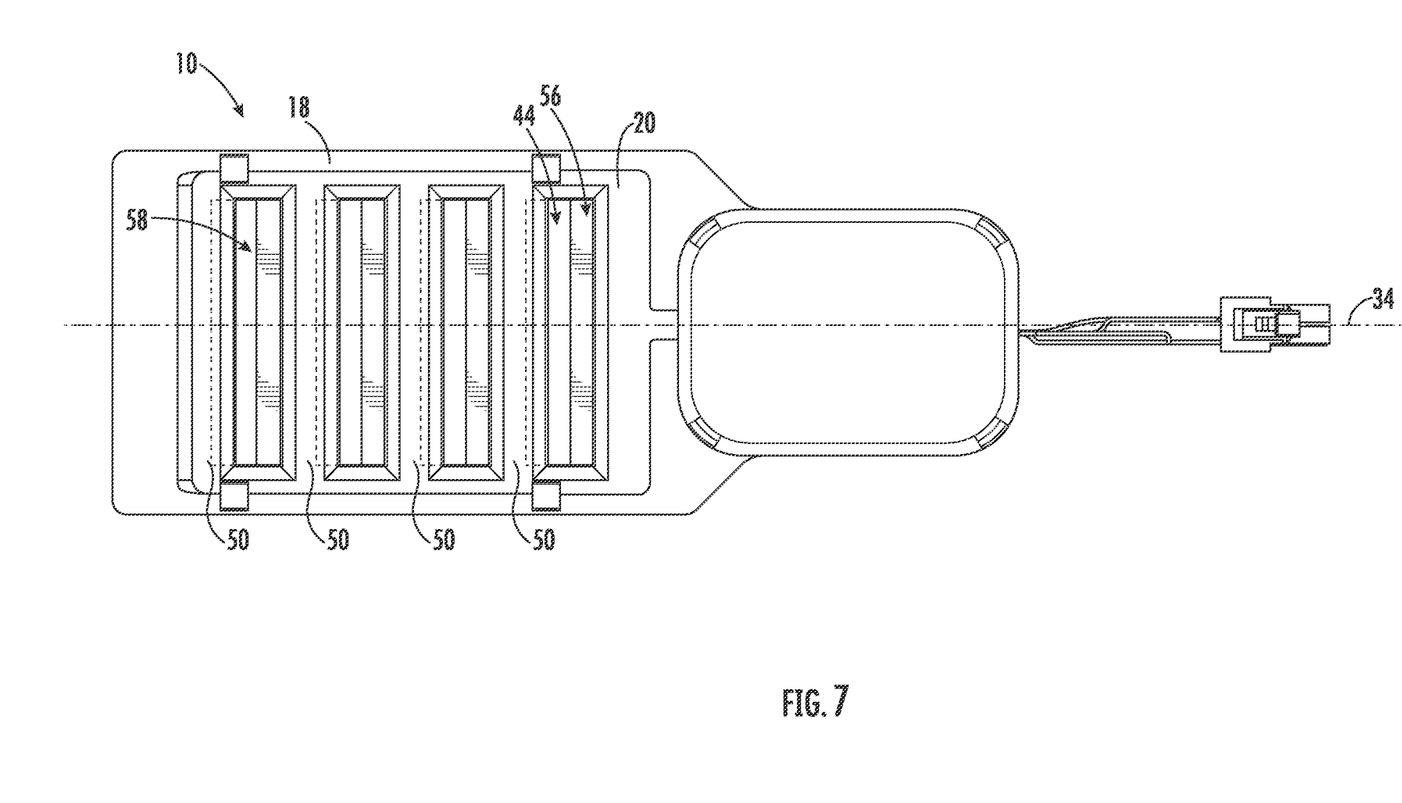
FIG. 7 is an isometric top view of the air damper of FIG. 2 in a partially closed position.

FIG. 7 illustrates the air damper 10 in a partially closed position. By partially closed it is meant the slide 20 has moved at least one linear step so that its plurality of slide closures 50 at least partially cover the plurality of plate openings 56 of plate 18. Thus, in a partially closed position, the area for the passage of air through the air damper 10 has been decreased to an area that is less than the maximum area provided in the fully open position. The stepper motor 36 is energized to move the slide 20 to one of the plurality of partially closed positions. However, upon reaching any one of the plurality of partially closed positions, the stepper motor 36 may be de-energized to save energy and the air damper 10 will remain in the partially closed position.

Each rotational step of the stepper motor 36 is converted into linear motion of the slide 20 via the gear train 54 (FIG. 2) so that the slide 20 moves in a linear step that is proportional to the rotational step. Thus, the slide 20 is moved in steps that are discrete linear distances in directions along the plate longitudinal axis 34 of the base plate 18. The stepper motor 36 is configured to rotate its shaft 37 in a first rotational direction a first rotational distance that can be measured in degrees or radians. By way of non-limiting example, the first direction can be clockwise 90 degrees. It can then rotate a second rotational distance or step another 90 degrees for a total of 180 degrees and can than continue to a full 360 degrees and beyond as desired. Each rotational movement of the shaft of the stepper motor 36 is in turn translated via the gear train 54 coupled to the drive arm 52 to move the slide 20 a first linear distance in a first linear direction.

The stepper motor 36 is also configured to move in a second rotational direction, opposite the first rotational direction to move the slide 20 a second linear direction opposite the first linear direction. Thus, to change the area of air passage through the plate 18, the stepper motor 36 is able to move the slide 20 over the base plate 18 to cover the plate openings 56, partially cover the plate openings 56, or align the slide openings 44 with the plurality of plate openings 56.

Figure 8:
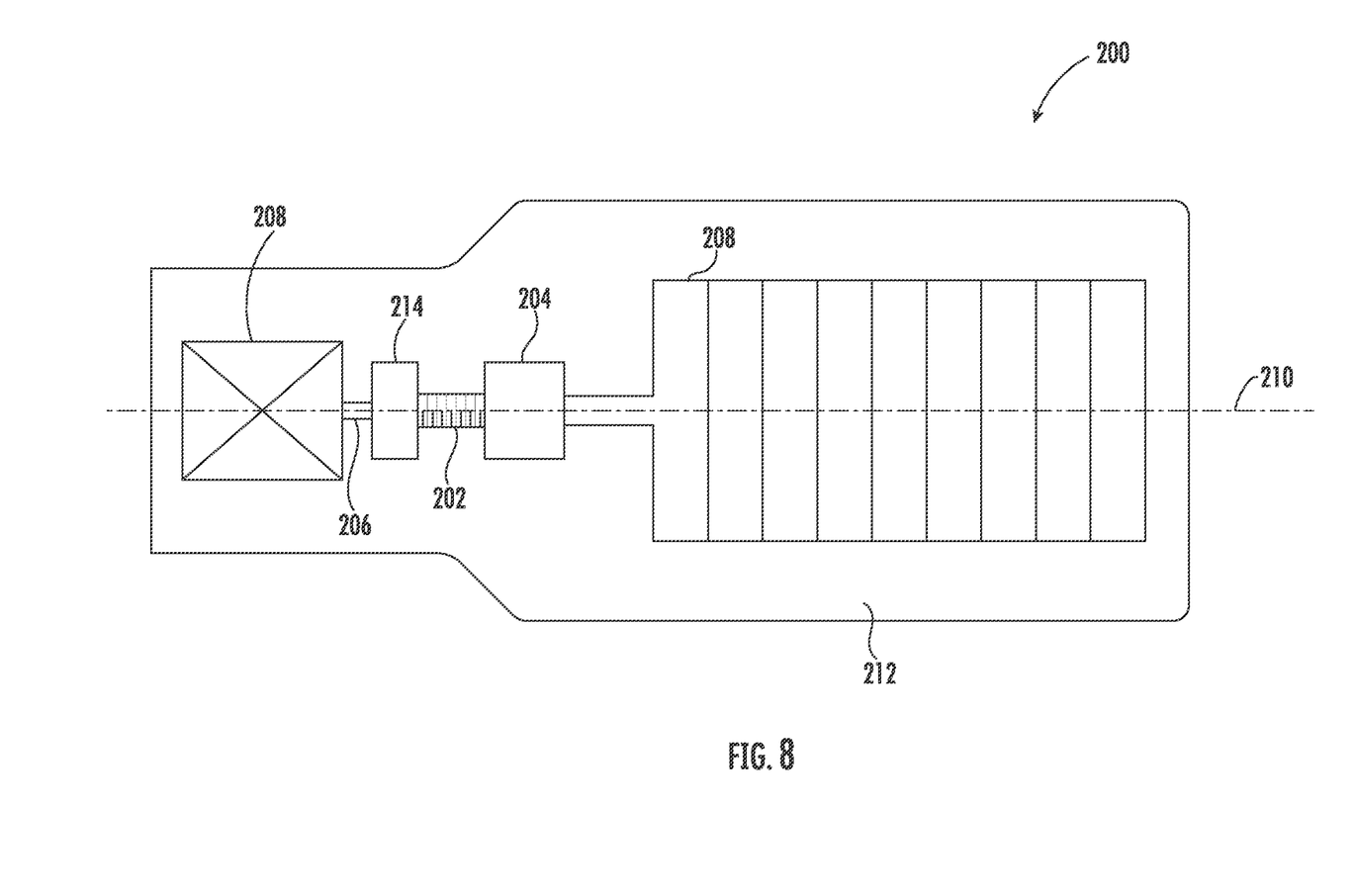
FIG. 8 is a schematic illustration of an embodiment of the air damper to show an internal drive screw coupled to the motor.

Turning now to FIG. 8, a schematic illustration of an air damper 200 is shown. Air damper 200 is similar to air damper 10 except for its use of an internal drive screw 202 and ball screw 204 to convert the rotational movement of the shaft 206 of the stepper motor 208 to linear motion of the slide 208. Unlike the shaft 37 (FIG. 3) of the stepper motor 36 (FIG. 3), here, the shaft 206 extends in a direction parallel to the longitudinal axis 210 of the plate 212. A gear mechanism 214 may act as a reduction gear for the shaft 206 to control the speed and torque of the linear drive screw 202 and in turn the speed of the ball screw 204.

The stepper motor 208 may rotate in a first rotational direction and a second rotational direction opposite the first direction. So too the internal drive screw 202 rotates in the same first and second rotational directions. Rotation of the internal drive screw 202 in the first rotational direction moves the ball screw 204 and the slide 208 coupled thereto in a first linear direction parallel to the longitudinal axis 210 of the plate 212. Rotation of the internal drive screw 202 in the second rotational direction moves the ball screw 204 and thus the slide 208 in a second linear direction opposite the first linear direction. Movement in discrete first linear and second linear directions allows for movement of the slide 208 to control the amount of air passing through the plate 212 of the air damper 200.

It is not the intent to limit the invention to only a ball screw 204 as a nut or similar threaded member may be utilized. In yet another embodiment, not illustrated, a slider-crank means may be used to convert the rotational motion of the shaft 206 to linear motion of the slide 208.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An air damper comprising:
   a base plate having a plurality of plate openings defining an area for the passage of air through the air damper;
   a slide, having a plurality of slide openings and a plurality of slide closures, the slide is slideable over the base plate;
   a stepper motor coupled to the slide to move the slide in linear steps to change the area for the passage of air; and
   wherein a gear train couples a shaft of the stepper motor to a toothed rack of the slide to convert rotational movement of the shaft to linear movement of the slide.

2. The air damper of claim 1, wherein the plurality of plate openings align with the plurality of slide openings in a fully open position of the air damper to provide for a maximum area for the passage of air through the air damper.

3. The air damper of claim 2, wherein the slide is moveable in a first linear direction in steps to change the position of the air damper from the fully opened positon of the air damper to a partially closed position of the air damper to decrease the maximum area for the passage of air to an amount less than the maximum area.

4. The air damper of claim 3, wherein each one of the plurality of slide closures partially covers a respective one of the plurality of plate openings in the partially closed position.

5. The air damper of claim 3, wherein the slide is moveable in the first linear direction in steps to move the air damper from the fully open position and the partially closed positon to a fully closed position of the air damper, wherein in the fully closed position the area for the passage of air is zero.

6. The air damper of claim 5, wherein a respective one of the plurality of slide closures completely covers and closes a respective one of the plurality of plate openings in a fully closed position.

7. The air damper of claim 3, wherein the partially closed position is a plurality of partially closed positions.

8. The air damper of claim 7, wherein a respective one of the slide closures moving from a first one of the plurality of closed positions to a next one of the plurality of closed positions covers more of a respective one of the plurality of plate openings relative to the first one of the closed positions.

9. The air damper of claim 3, wherein the slide is moveable in steps in a second linear direction from a fully closed position of the air damper to the partially closed position to increase the area for the passage of air from zero to an amount less than the maximum area.

10. The air damper of claim 3, wherein the slide is moveable in steps in a second linear direction from a fully closed position of the air damper to the fully open position of the air damper.

11. The air damper of claim 3, wherein the stepper is energized to move the slide to a position along the base plate to provide the partially closed position of the air damper and de-energizing the stepper motor leaves the slide in the position and the air damper in the partially closed position.

12. The air damper of claim 1, further comprising a controller operably coupled to the air damper, the controller programmed to control the stepper motor to open and closing of the air damper.

13. The air damper of claim 1, wherein rotation of the stepper motor a first rotational distance in a first rotational direction moves the slide a first linear distance in the first linear direction along the base plate.

14. The air damper of claim 13, wherein rotation of the stepper motor a second rotational distance in a second rotational direction, opposite the first rotational direction moves the slide a second linear distance, in a second linear direction, opposite the first linear direction, and wherein the absolute value of the first and second linear distances are equal.

15. A refrigerator/freezer unit, comprising:
a refrigerator compartment;
a freezer compartment;
an air damper between the refrigerator compartment and the freezer compartment, the air damper comprising;
a base plate having a plurality of plate openings defining an area for the passage of air;
a slide having a plurality of slide openings and a plurality of slide closures,
a stepper motor coupled to the slide to move the slide in linear steps to change the area for the passage of air to control a temperature of the refrigerator compartment;
wherein the slide has a drive arm at a slide end proximate the stepper motor; and
wherein a gear train couples the stepper motor to the drive arm to convert rotational movement of a shaft of the stepper motor to linear movement of the slide.

16. The refrigerator/freezer unit of claim 15, wherein the stepper motor is a 12 volt DC motor.

17. The refrigerator/freezer unit if claim 15, wherein the slide is moveable in linear steps to provide an open, a closed and a partially closed state of the air damper.

18. The refrigerator/freezer unit of claim 17, wherein the stepper motor is operable to rotate in a first rotational direction, a second rotational direction, opposite the first rotational direction to move the slide to any one of the open, closed or partially closed positions.

19. An air damper comprising:
a base plate having a plurality of plate openings defining an area for the passage of air through the air damper;
a slide, having a plurality of slide openings and a plurality of slide closures, the slide is slideable over the base plate;
a stepper motor coupled to the slide to move the slide in linear steps to change the area for the passage of air; and
wherein a linear drive screw and ball screw convert rotational movement of a shaft of the stepper motor or linear movement of the slide.

20. An air damper comprising:
a base plate having a plurality of plate openings defining an area for the passage of air through the air damper;
a slide, having a plurality of slide openings and a plurality of slide closures, the slide is slideable over the base plate;
a stepper motor coupled to the slide to move the slide in linear steps to change the area for the passage of air; and
wherein a printed control board located in the air damper includes a temperature sensor to sense an over-temp of the stepper motor and stop the stepper motor.

* * * * *

UNITED STATES PATENT AND TRADEMARK OFFICE
CERTIFICATE OF CORRECTION

PATENT NO. : 11,359,854 B2
APPLICATION NO. : 16/454347
DATED : June 14, 2022
INVENTOR(S) : Kyle William Svejcar et al.

It is certified that error appears in the above-identified patent and that said Letters Patent is hereby corrected as shown below:

In the Claims

Claim 3, Line 3 reads "position of the air damper from the fully opened positon of" and should read --position of the air damper from the fully opened position of--

Signed and Sealed this
Thirteenth Day of June, 2023

Katherine Kelly Vidal
Director of the United States Patent and Trademark Office